United States Patent
Zanier et al.

(10) Patent No.: US 11,463,531 B2
(45) Date of Patent: Oct. 4, 2022

(54) USING CELLULAR IDENTIFIERS IN INTELLIGENT TRANSPORT SYSTEMS COMMUNICATION INFRASTRUCTURE

(71) Applicant: Nokia Solutions and Networks Oy, Espoo (FI)

(72) Inventors: Paolo Zanier, Munich (DE); Wolfgang Scheidl, Bernhardswald (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/565,544

(22) PCT Filed: Apr. 10, 2015

(86) PCT No.: PCT/EP2015/057810
§ 371 (c)(1),
(2) Date: Oct. 10, 2017

(87) PCT Pub. No.: WO2016/162077
PCT Pub. Date: Oct. 13, 2016

(65) Prior Publication Data
US 2018/0124186 A1    May 3, 2018

(51) Int. Cl.
*H04L 67/147*    (2022.01)
*H04L 67/12*    (2022.01)
(Continued)

(52) U.S. Cl.
CPC ............ *H04L 67/147* (2013.01); *H04L 67/12* (2013.01); *H04W 4/06* (2013.01); *H04W 4/70* (2018.02);
(Continued)

(58) Field of Classification Search
CPC ....... H04L 67/147; H04L 67/12; H04L 69/22; H04W 40/20; H04W 4/06; H04W 4/70;
(Continued)

(56) References Cited

U.S. PATENT DOCUMENTS

| 8,279,082 B2 * | 10/2012 | Machida ............... H04L 5/143 |
| | | 340/901 |
| 2004/0260805 A1 * | 12/2004 | Aoyama ........... H04W 36/0066 |
| | | 709/224 |

(Continued)

FOREIGN PATENT DOCUMENTS

| CN | 104170415 A | 11/2014 |
| EP | 0 964 541 A2 | 12/1999 |

(Continued)

OTHER PUBLICATIONS

ETSI, "Intelligent Transport System (ITS); Vehicular Communications; GeoNetworking; Part3: Network Architecture", Mar. 2010, ETSI TS102 636-3 V1.1.1 Technical Specification, 23 pages (Year: 2010).*

(Continued)

*Primary Examiner* — Ivan O Latorre
(74) *Attorney, Agent, or Firm* — Harrington & Smith

(57) ABSTRACT

The present invention provides apparatuses, methods, computer programs, computer program products and computer-readable media regarding using cellular identifiers in intelligent transport systems (ITS) communication infrastructure. The method includes composing a header of a message to be distributed within the intelligent transport system by the communication node, the communication node being capable of communicating at least in accordance with a cellular network, and inserting into the header at least one identifier according to the cellular communication network of the communication node.

18 Claims, 6 Drawing Sheets

(51) Int. Cl.
*H04W 4/70* (2018.01)
*H04W 4/06* (2009.01)
*H04W 40/20* (2009.01)
*H04W 36/00* (2009.01)
*H04W 84/18* (2009.01)

(52) U.S. Cl.
CPC ........ *H04W 40/20* (2013.01); *H04W 36/0061* (2013.01); *H04W 84/18* (2013.01)

(58) Field of Classification Search
CPC .. H04W 64/00; H04W 84/18; H04W 36/0061
See application file for complete search history.

(56) References Cited

U.S. PATENT DOCUMENTS

| | | | | |
|---|---|---|---|---|
| 2005/0148315 | A1* | 7/2005 | Sawada | H04B 7/2606 455/403 |
| 2007/0086388 | A1* | 4/2007 | Kang | H04W 36/30 370/331 |
| 2007/0191040 | A1* | 8/2007 | Kadar | H04L 29/06027 455/466 |
| 2009/0245196 | A1* | 10/2009 | Iseda | H04W 72/0433 370/329 |
| 2009/0296680 | A1* | 12/2009 | Suzuki | H04W 72/0406 370/342 |
| 2012/0309425 | A1 | 12/2012 | El Khayat et al. | |
| 2013/0322368 | A1* | 12/2013 | Nagai | H04W 74/0808 370/329 |
| 2015/0111519 | A1* | 4/2015 | Li | H04W 76/50 455/404.1 |
| 2016/0073298 | A1* | 3/2016 | Brahmi | H04W 72/0453 455/436 |

FOREIGN PATENT DOCUMENTS

| | | | |
|---|---|---|---|
| EP | 2852194 B1 | 9/2016 | |
| JP | 2014/519258 A | 8/2014 | |
| WO | WO-2012/159684 A1 | 11/2012 | |
| WO | 2014000183 A1 | 1/2014 | |
| WO | WO-2014067157 A1 * | 5/2014 | ............ H04L 41/00 |
| WO | WO-2014/173429 A1 | 10/2014 | |
| WO | WO 2016134752 A1 | 9/2016 | |

OTHER PUBLICATIONS

Ou et al., "The UMTS-AKA Protocols for Intelligent Transportation Systems", 2009, Hindawi Publishing Corporation EURASIP Journal on Wireless Communications and Networking, vol. 2009, Article ID 267283, 12 pages (Year: 2009).*

Le, Long et al. "Infrastructure-Assisted Communication for CAR-to-X Communication." (2011). (Year: 2011).*

3GPP TS 23.003 V13.0.0 (Dec. 2014); 3rd Generation Partnership Project; Technical Specification Group Core Network and Terminals; Numbering, addressing and identification (Release 13).

3GPP TS 23.003 V13.10.0 (Sep. 2017); 3rd Generation Partnership Project; Technical Specification Group Core Network and Terminals; Numbering, addressing and identification (Release 13).

Final Draft ETSI EN 302 637-3 V1.2.1 (Sep. 2014); Intelligent Transport Systems (ITS); Vehicular Communications; Basic Set of Applications; Part 3: Specifications of Decentralized Environmental Notification Basic Service.

ETSI TS 102 636-4-1 V1.1.1 (Jun. 2011); Intelligent Transport Systems (ITS); Vehicular communications; GeoNetworking; Part 4: Geographical addressing and forwarding for point-to-point and point-to-multipoint communications; Sub-part 1: Media-Independent Functionality.

ETSI TS 102 637-2 V1.2.1 (Mar. 2011); Intelligent Transport Systems (ITS); Vehicular Communications; Basic Set of Applications; Part 2: Specification of Cooperative Awareness Basic Service.

IEEE Std 802.11p-2010; IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 6: Wireless Access in Vehicular Environments.

De Rango, F., et al., "Hierarchical trajectory-based routing protocol for Vehicular Ad Hoc Networks", International Symposium on Performance Evaluation of Computer and Telecommunication Systems, 2008, SPECTS 2008, IEEE, Conference Jun. 16-18, 2008, abstract only, 1 pg.

ETSI TS 102 894-2, V1.1.1, "Intelligent Transport Systems (ITS); Users and applications requirements; Part 2 Applications and facilities layer common data dictionary" (archive.org), Aug. 2013, 78 pages.

Archive of ETSI, "Intelligent Transport Systems" web page, at ETSI—Intelligent Transport (archive.org), Jan. 2, 2016, 2 pages.

* cited by examiner

USING CELLULAR IDENTIFIERS IN INTELLIGENT TRANSPORT SYSTEMS COMMUNICATION INFRASTRUCTURE

FIELD OF THE INVENTION

The present invention relates to apparatuses, methods, systems, computer programs, computer program products and computer-readable media regarding using cellular identifiers in intelligent transport systems (ITS) communication infrastructure.

BACKGROUND OF THE INVENTION

Usage of cellular system for other purposes than human relevant services is well under way. Several Mobile Network Operators count the M2M (Machine to Machine) subscriptions in Millions. In order to make the cellular system more suitable for adjacent industries applications, 3GPP is spending a lot of efforts in considering new requirements.

For instance, work recently started in 3GPP ($3^{rd}$ Generation Partnership Project) SA1 (Service and Systems Aspects Working Group 1) to improve LTE (Long Term Evolution) for V2X (Vehicle to Vehicle and Vehicle to Infrastructure) communication. On the other hand, ETSI (European Telecommunications Standards Institute) is developing standards for Intelligent Transport Systems (cf. http://www.etsi.org/technologies-clusters/technologies/intelligent-transport) specifying own communication protocols, transport and networking on top of multiple access systems (including cellular). More specifically, ETSI ITS specifies geo-networking so that it can work on top of 802.11p and cellular (ETSI TS 102 636).

The basic communication service protocols specified in ETSI ITS include in the protocol header geo-coordinates to specify vehicle location or message dissemination area and ITS station identification to identify source/destination. The coordinates are used for geo-routing messages in 802.11p ad-hoc networks and intended to identify cells where the information needs to be forwarded (e.g. by using MBMS (Multimedia Broadcast Multicast Service) in case of a broadcast) in cellular systems.

Currently, the cellular solution would be based on Geo-Servers (not commercially implemented in the field yet) that would be inserted, for example, in the operator network and somehow map the coordinates received from vehicles in ITS messages to users and cells where they are camping on. Cell identifiers would then be used for defining specific MBMS service areas.

This is a possible solution to the problem of disseminating ITS messages in a cellular network and it is implemented as an overlay to the cellular access itself.

It is noted that the upper layers of the ETSI ITS standard are access agnostic. This might be considered a good thing in principle. However, promoting the usage of cellular networks for ITS (especially for 5G) would benefit from making the application (in this case ITS appliances layer) aware of the cellular capabilities and identifiers. This requires impacting ETSI ITS standards.

SUMMARY OF THE INVENTION

It is therefore an object of the present invention to overcome the above mentioned problems and to provide apparatuses, methods, systems, computer programs, computer program products and computer-readable media regarding using cellular identifiers in intelligent transport systems (ITS) communication infrastructure.

According to an aspect of the present invention there is provided a method for use in a communication node in an intelligent transport system, comprising composing a header of a message to be distributed within the intelligent transport system by the communication node, the communication node being capable of communicating at least in accordance with a cellular network, and inserting into the header at least one identifier according to the cellular communication network of the communication node.

According to another aspect of the present invention there is provided a method for use in road side unit in an intelligent transport system, comprising receiving a message from a first communication node in the intelligent transport system, deciding, based on location information of the first communication node and location information of at least a second communication node, whether the message is relevant for the at least one second communication node, if it is decided that the message is relevant for the at least one second communication node, determining at least one identifier according to a cellular communication network of the at least one second communication node, and causing forwarding the message to the at least one second communication node via the cellular network based on the identifier.

According to another aspect of the present invention there is provided an apparatus for use in a communication node in an intelligent transport system, comprising at least one processor, and at least one memory for storing instructions to be executed by the processor, wherein the at least one memory and the instructions are configured to, with the at least one processor, cause the apparatus at least to perform:

composing a header of a message to be distributed within the intelligent transport system by the communication node, the communication node being capable of communicating at least in accordance with a cellular network, and inserting into the header at least one identifier according to the cellular communication network of the communication node.

According to another aspect of the present invention there is provided an apparatus for use in road side unit in an intelligent transport system, comprising at least one processor, and at least one memory for storing instructions to be executed by the processor, wherein the at least one memory and the instructions are configured to, with the at least one processor, cause the apparatus at least to perform:

receiving a message from a first communication node in the intelligent transport system, deciding, based on location information of the first communication node and location information of at least a second communication node, whether the message is relevant for the at least one second communication node, if it is decided that the message is relevant for the at least one second communication node,
determining at least one identifier according to a cellular communication network of the at least one second communication node, and
causing forwarding the message to the at least one second communication node via the cellular network based on the identifier.

According to another aspect of the present invention there is provided an apparatus for use in a communication node in an intelligent transport system, comprising
means for composing a header of a message to be distributed within the intelligent transport system by the communication node, the communication node being capable of communicating at least in accordance with a cellular network, and
means for inserting into the header at least one identifier according to the cellular communication network of the communication node.

According to another aspect of the present invention there is provided an apparatus for use in road side unit in an intelligent transport system, comprising
means for receiving a message from a first communication node in the intelligent transport system,
means for deciding, based on location information of the first communication node and location information of at least a second communication node, whether the message is relevant for the at least one second communication node,
if it is decided that the message is relevant for the at least one second communication node,
means for determining at least one identifier according to a cellular communication network of the at least one second communication node, and
mans for causing forwarding the message to the at least one second communication node via the cellular network based on the identifier.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
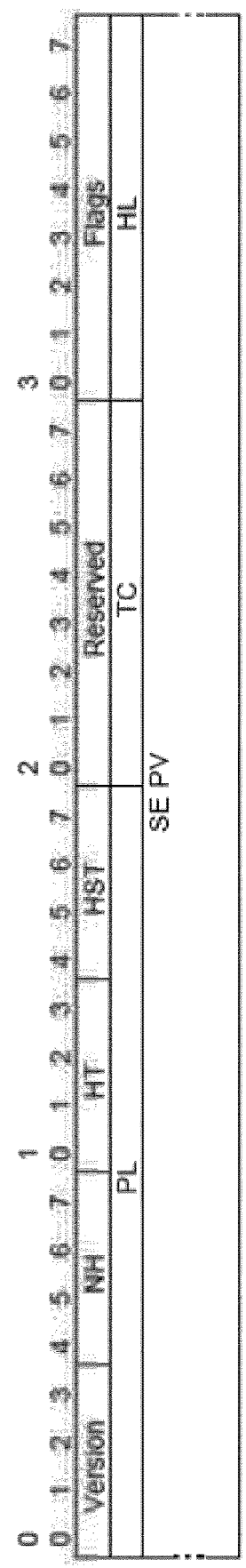
FIG. 1 is an overview of the common geo-networking header.

In the following, some example versions of the disclosure and embodiments of the present invention are described with reference to the drawings. For illustrating the present invention, the examples and embodiments will be described in connection with a vehicle-to-vehicle (V2V) and a vehicle-to-Infrastructure communication system, like for example Intelligent Transport System (ITS) and a cellular communication network based on a 3GPP based communication system, for example an LTE/LTE-A based system. However, it is to be noted that the present invention is not limited to an application using such types of communication systems or communication networks, but is also applicable in other types of communication systems or communication networks, like for example 5G communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, network access control elements like AAA servers and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to some example versions of the present invention, it is proposed to extend the ETSI ITS PDU (Packet Data Unit) header and/or the geo-networking header to include cellular identifiers (such as, for example, (global) cell identifiers, tracking area/routing area identifiers (TAI/LAI), subscription identifiers (e.g. IMSI (International Mobile Subscriber Identity), S/M-TMSI (S/M-Temporary Mobile Subscriber Identity) or C-RNTI (Cell Radio Network Temporary Identity) and the like) or device identifiers (e.g. IMEI (International Mobile Equipment Identity and the like)).

Below there is shown a short extract of the ASN.1 encoding of ETSI ITS PDU header (ETSI TS 102 894-2 V1.1.1 (2013 August), pag3 70). Highlighted (underlined) are ITS Station Identifier (stationID) and the vehicle Reference Position (Absolute geographical coordinates including accuracy).

```
ITS-Container {
itu-t (0) identified-organization (4) etsi (0) itsDomain (5) wg1 (1) ts
(102894) cdd (2) version
(1)
}
DEFINITIONS AUTOMATIC TAGS ::=
BEGIN
ItsPduHeader ::= SEQUENCE {
protocolVersion INTEGER{ currentVersion(1) } (0..255),
messageID INTEGER{ denm(1),cam(2), poi(3), spat(4), map(5), ivi(6),
ivs(7), ev- rsr(8) }
(0..255),
stationID StationID
}
StationID ::= INTEGER(0..4294967295)
ReferencePosition ::= SEQUENCE {
latitude Latitude,
longitude Longitude,
positionConfidenceEllipse PosConfidenceEllipse ,
altitude Altitude
}
....
```

According to some example versions of the present invention, the ITS PDU header could be enriched by adding cellular subscriber and/or device identifiers next to ITS Station ID (e.g. IMSI, S/M-TMSI, c-RNTI, IMEI or the like) and cellular location identifiers (e.g. (global) cell identifier or routing/tracking area and the like) next to Reference Position.

These additional fields could be used by the cellular system for forwarding the information directly, without the need to rely on upper layers (e.g., a GeoServer, standalone or part of an ITS platform, as set out above). This is not only more efficient but has shorter latency. Such a capability differentiates cellular from other technologies (specifically 802.11p).

In addition/as an alternative, the same information could be used as additional filtering criteria for delivery of messages in an ETSI ITS station in order to use advanced cellular network features, e.g. broadcast or multi-cast (currently envisioned for enriching LTE feature set for V2V, SA1 study item in 3GPP).

In addition/as an alternative, cellular identifiers (location) could be added to the geo-networking header.

FIG. 1 shows the common geo-networking header as defined in ETSI TS 102 636-4-1 V1.1.1.

The header shown in FIG. 1 comprises the following fields:

Version: identifies the version of the GeoNetworking protocol.

NH: Identifies the type of header immediately following the GeoNetworking header as specified in table 5 of ETSI TS 102 636-4-1 V1.1.1.

HT: Identifies the type of the GeoAdhoc header type as specified in table 6 of ETSI TS 102 636-4-1 V1.1.1.

HST: Identifies the sub-type of the GeoAdhoc header type as specified in table 6 of ETSI TS 102 636-4-1 V1.1.1.

Reserved: Reserved for media-dependent functionality.

Flags: Bit 0 to 5: Reserved. Set to 0. Bit 6: Type if ITS station. Bit 7: Reserved. Set to 0.

PL: Length of the Network Header payload, i.e. the rest of the packet following the whole GeoNetworking header in octets.

TC: Traffic class that represents Facility-layer requirements on packet transport. It is composed of four sub-fields.

HL: Decremented by 1 by each GeoAdhoc router that forwards the packet. The packet must not be forwarded if Hop Limit is decremented to zero.

SE PV: Long position vector of the sender. It shall carry the fields as specified in clause 8.4.2 of ETSI TS 102 636-4-1 V1.1.1. (Long Position Vector). Length: 28 octets.

According to some example versions of the present invention, it is relevant that the header includes the field SE PV (long version of the Position Vector), identifying the location of the sender.

According to some example versions of the present invention, it is proposed to introduce two additional fields after the SE PV to specify the cellular subscriber and/or device identifiers (e.g. IMSI, S/M-TMSI, c-RNTI, IMEI or the like) and cellular location identifiers (e.g. (global) cell identifier or routing/tracking area and the like). For details regarding the format of the respective identifiers, reference is made to 3GPP document TS 23.003.

Figure 2:
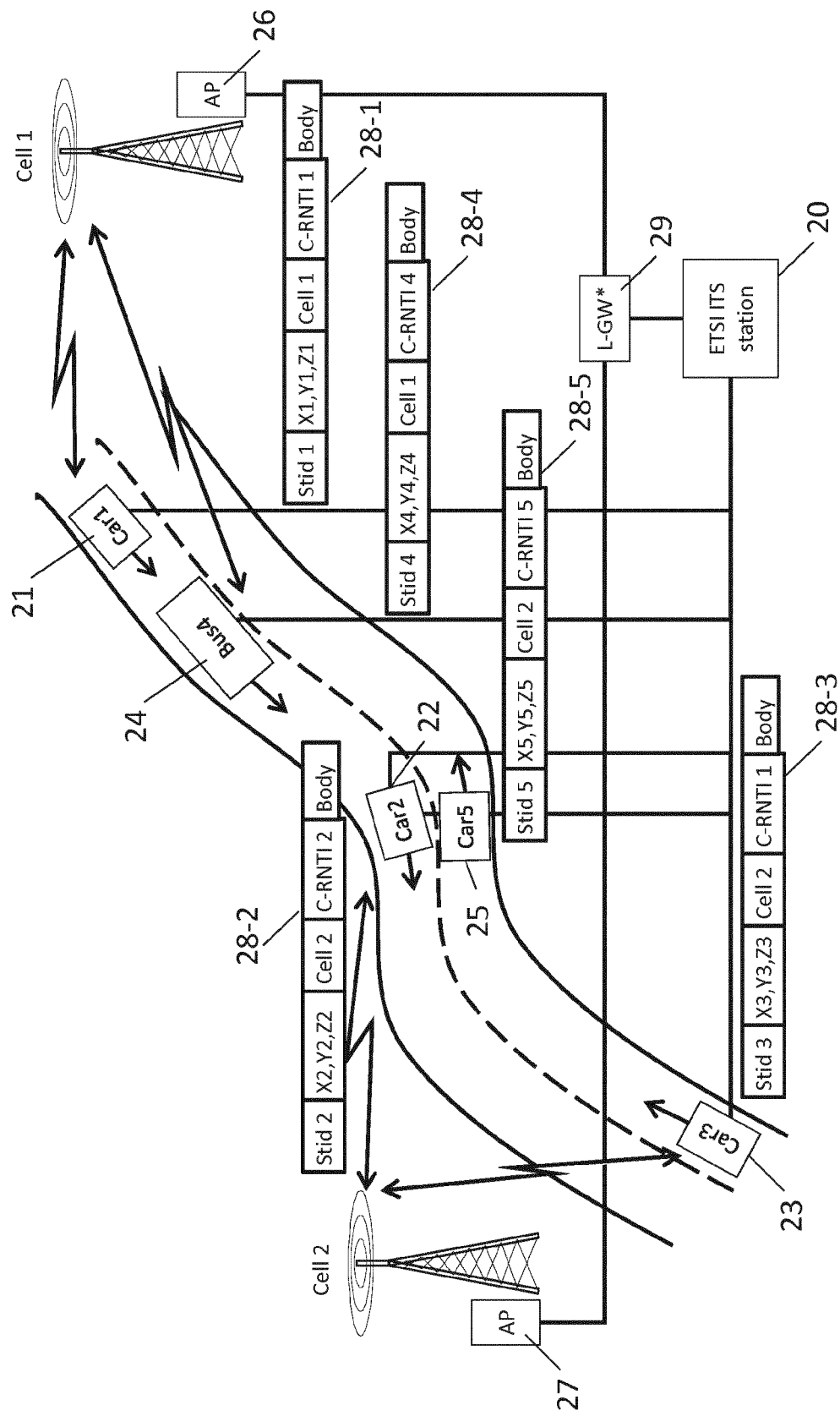
FIG. 2 is an overview of an example of an implementation according to some example versions of the present invention.

FIG. 2 shows an example of an implementation according to some example versions of the present invention, with a road side ITS station 20 collecting information on the vehicles 21 to 25 (in FIG. 2 denoted as car1, car2, car3, bus 4 and car5) in a certain geographical area served by two Access Points (APs) 26 and 27.

It is noted that APs are in principle not always needed according to ETSI standards; namely, in many use cases the communication happens only among vehicles using 802.11p radio without support from infrastructure. However, extension of coverage range of 802.11p beyond 200-300 m or more complex use cases with a mixture of vehicles and road side infrastructure as well as more complex processing logic using additional sources of information (e.g. local HD maps) require a road side unit.

Going back to FIG. 2, each vehicle 21 to 25 includes in the ITS header (28-1 to 28-5 in FIG. 2) of the Cooperative Awareness Message (CAM), in addition to ITS Station identifier and GPS coordinates, the global cell identifier and the cell specific UE temporary identifier (C-RNTI). Thus, for vehicle 21 (car1), for example, the header 28-1 includes "Stid1" as the ITS Station identifier, "X1, Y1, Z1" as the GPS coordinates, "Cell 1" as the global cell identifier, "C-RNTI 1" as the cell specific UE temporary identifier, and further information denoted as "body" (i.e. the CAM message itself). This applies in a similar manner to the header 28-2 to 28-5 of vehicles 22 to 25, respectively.

It is noted that the header is not complete, but just shows information relevant in the context of the present invention.

The ITS station 20 keeps an up-to-date table with all information. In the example shown in FIG. 2, the table would be as follows.

| Station identifier | GPS coordinates | global cell identifier | C-RNTI | IP-address |
|---|---|---|---|---|
| 1 | X1, Y1, Z1 | 1 | 1 | 10.168.1.10 |
| 2 | X2, Y2, Z2 | 2 | 2 | 10.168.1.12 |
| 3 | X3, Y3, Z3 | 2 | 1 | 10.168.1.13 |
| 4 | X4, Y4, Z4 | 1 | 4 | 10.168.1.14 |
| 5 | X5, Y5, Z5 | 2 | 5 | 10.168.1.20 |

When a message is received from one of the vehicles (e.g. a warning sent by Car1 when overcoming the Bus4), the road side ITS station 20 can decide based on GPS coordinates for which other vehicles the message is relevant.

Based on the current standard, the ITS platform would send the warning message using available IP unicast (via the local gateway, L-GW* 29). This is reasonable in case the number of involved vehicles is limited but can quickly overload the network in case the vehicle density in the area is high.

Alternatively, a cellular broadcasting/multicasting mechanism would provide efficient delivery of the same information over the cellular. These mechanisms are currently available in 3GPP only using eMBMS but might in the future become part of the L-GW (this is the reason for the *) or even AP services to support low latency use cases.

In case of broadcasting, the road side ITS station could simply specify the cell identifiers where the vehicle to be informed are connected to. The L-GW* would use the info to send a single e.g. IP packet to the APs to be broadcasted on the air interface.

In case of multi-cast, UE permanent or temporary identifiers (e.g. C-RNTI) along with cell identifier could be used to instruct the radio to send the information to selected vehicles.

In the example shown in FIG. 2, when Car1 overcomes the Bus4, an application in the roadside unit could decide that the bus driver as well as the driver of Car5 need to be alerted. Currently, an ITS platform would send two separate messages to the corresponding IP addresses.

In the setup envisioned according to some example versions of the present invention, the ITS station 20 asks the cellular system to deliver the message to cell 1-C-RNTI 4 (Bus4) and cell 2-C-RNTI 5 (Car5). Obviously, in this specific example this approach is equivalent in complexity and has no immediate benefit since there are only two vehicles involved. However, the situation would change, as said earlier, in case of having a larger group of cars involved in the message exchange.

Figure 3:
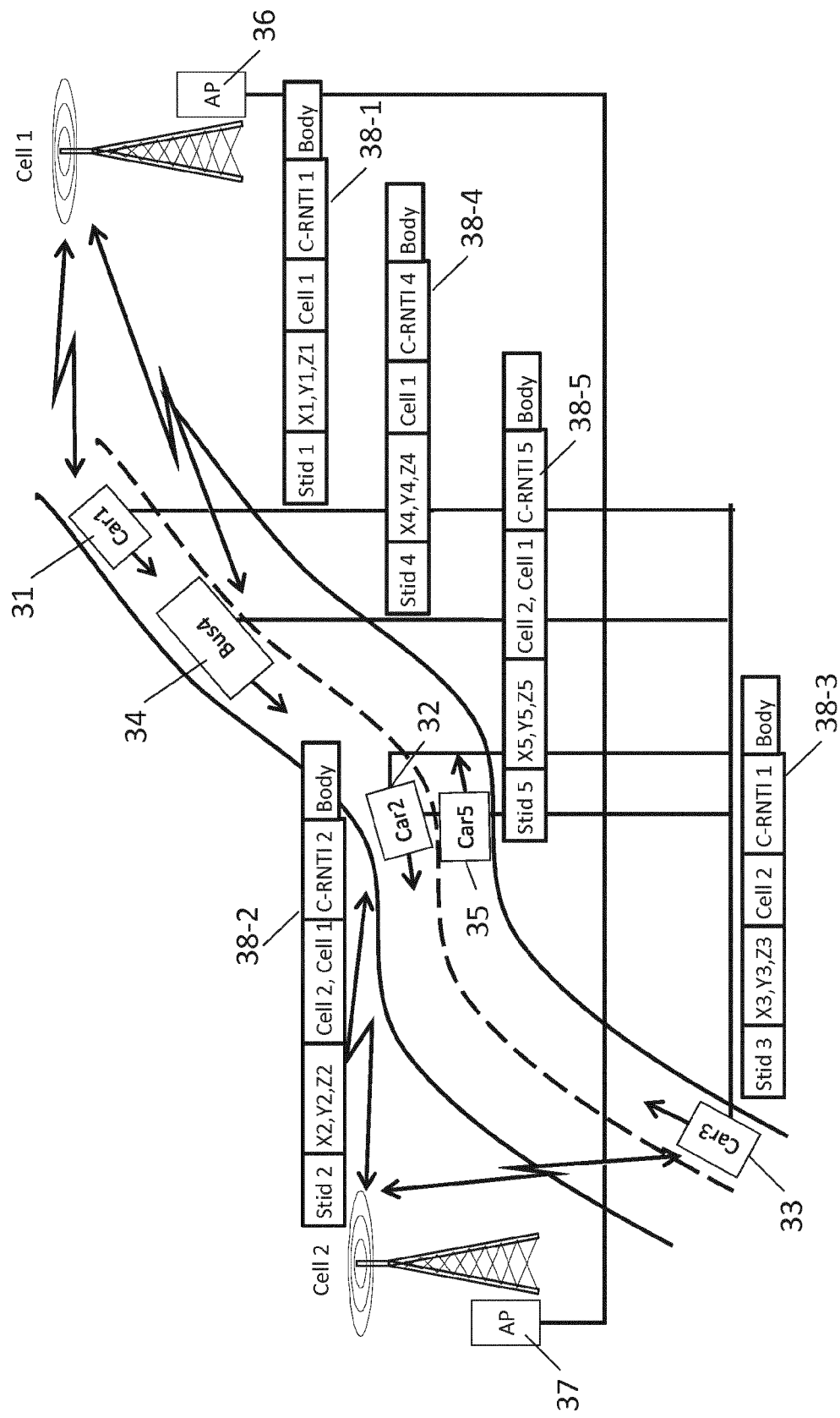
FIG. 3 is an overview of another example of an implementation according to some example versions of the present invention.

FIG. 3 shows another example of an implementation according to some example versions of the present invention. In the example shown in FIG. 3, there are vehicles 31 to 35 (in FIG. 3 denoted as car1, car2, car3, bus 4 and car5) in a certain geographical area served by two Access Points (APs) 36 and 37.

In the example shown in FIG. 3, the road side ITS station and the L-GW are not present. The information on the vehicles 31 to 35 are collected by the two Access Points (APs) 36 and 37.

In a similar manner as described above with respect to FIG. 2, each vehicle 31 to 35 includes in the ITS header (38-1 to 38-5 in FIG. 3) of the Cooperative Awareness Message (CAM), in addition to ITS Station identifier and GPS coordinates, the global cell identifier and the cell specific UE temporary identifier (C-RNTI). Thus, for vehicle 31 (car1), for example, the header 38-1 includes "Stid1" as the ITS Station identifier, "X1, Y1, Z1" as the GPS coordinates, "Cell 1" as the global cell identifier, "C-RNTI 1" as the cell specific UE temporary identifier, and further information denoted as "body" (i.e. the CAM message itself). This applies in a similar manner to the header 28-2 to 28-5 of vehicles 22 to 25, respectively.

However, in the example shown in FIG. 3, the ITS station potentially insert more than one CELL ID in the message header. In fact, all vehicles at cell edge would have to report the serving cell as well as the neighbor cell(s) with similar received power.

Thus, as shown in FIG. 3, the header of Car2 32, for example, additionally includes "Cell 1" as the global cell identifier although it is currently served by Cell 2. In the example shown in FIG. 3, this applies in a similar manner to Car5 35.

The APs 36 and 37 keep an up-to-date table with all information. In the example shown in FIG. 3, the table would be as follows.

| Station identifier | GPS coordinates | global cell identifier | C-RNTI | IP-address |
|---|---|---|---|---|
| 1 | X1, Y1, Z1 | 1 | 1 | 10.168.1.10 |
| 2 | X2, Y2, Z2 | 2, 1 | 2 | 10.168.1.12 |
| 3 | X3, Y3, Z3 | 2, 1 | 1 | 10.168.1.13 |
| 4 | X4, Y4, Z4 | 1 | 4 | 10.168.1.14 |
| 5 | X5, Y5, Z5 | 2 | 5 | 10.168.1.20 |

The set of cells in the ITS header message/geo-networking message would then be used for the forwarding decision in the AP.

In the present example, when Car1 notifies that it is overcoming the Bus4, the message would be received by AP 36. A local forwarder in AP 36 would send the information to all devices in the table that reported cell 1 as serving cell or neighbor cell or broadcast the message in cell 1 and 2.

In the following, a more general description of example versions of the present invention is made with respect to FIGS. 4 to 6.

Figure 4:
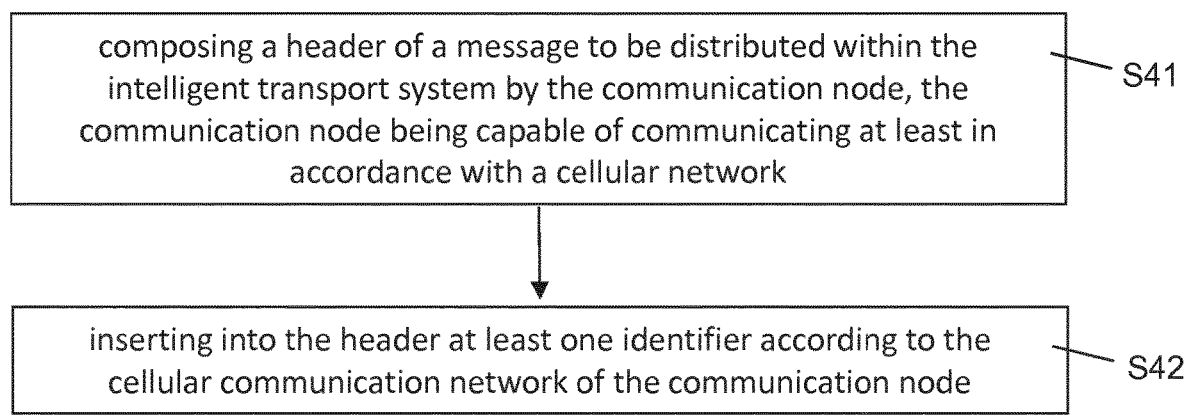
FIG. 4 is a flowchart illustrating an example of a method according to some example versions of the present invention.

FIG. 4 is a flowchart illustrating an example of a method according to example versions of the present invention.

According to some example versions of the present invention, the method may be implemented in or may be part of a network element or communication node of the ITS like, for example, an ITS station or the like. The method comprises composing a header of a message to be distributed within the intelligent transport system by the communication node in a step S41, the communication node being capable of communicating at least in accordance with a cellular network, and inserting into the header at least one identifier according to the cellular communication network of the communication node in a step S42.

According to some example versions of the present invention, the method further comprises distributing the message within the intelligent transport system.

According to some example versions of the present invention, the header is a geo-networking header or an intelligent transport system, ITS, packet data unit header.

According to some example versions of the present invention, the communication node is configured to insert at least an identifier corresponding to a serving cell and an identifier corresponding to a neighbor cell based on handover criteria.

According to some example versions of the present invention, the identifier is a cellular identifier identifying a specific cell or area, or the identifier is a subscription or device identifier identifying a specific subscription or device.

Figure 5:
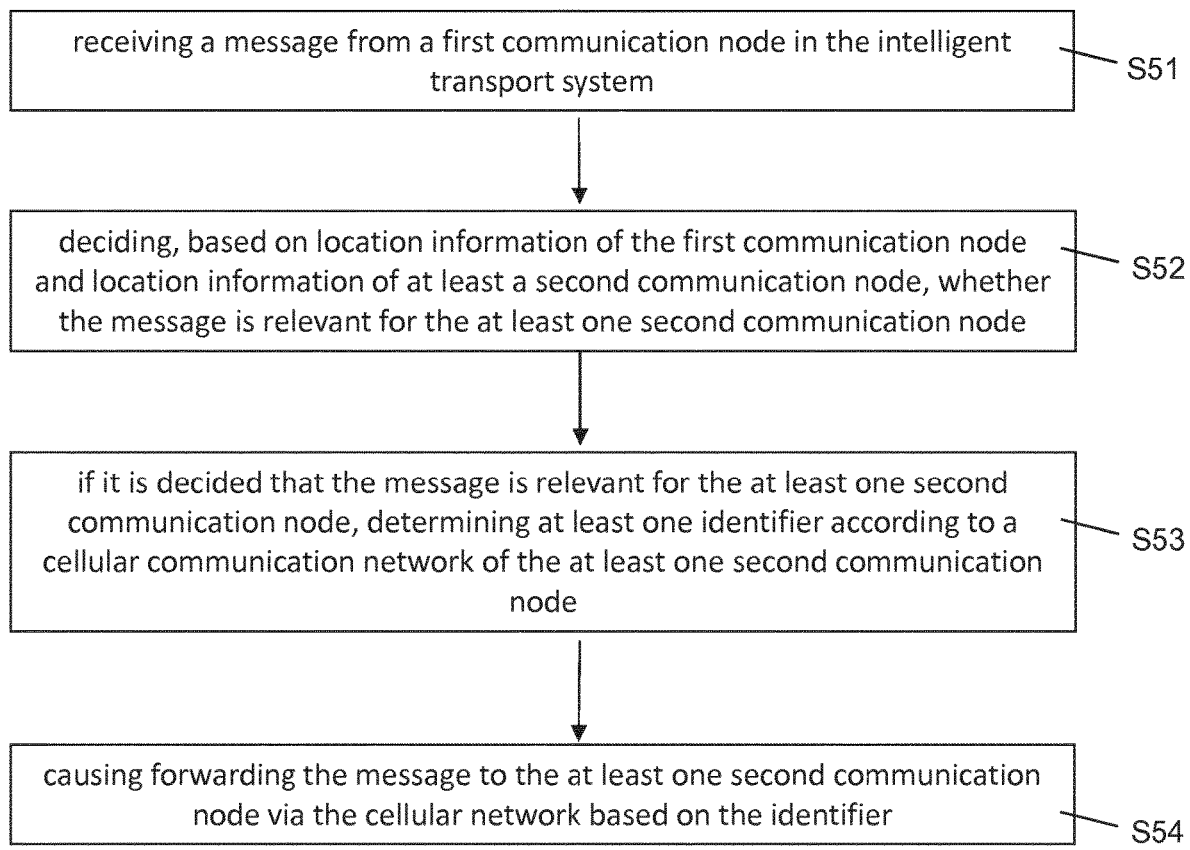
FIG. 5 is a flowchart illustrating another example of a method according to some example versions of the present invention.

FIG. 5 is a flowchart illustrating another example of a method according to example versions of the present invention.

According to some example versions of the present invention, the method may be implemented in or may be part of a road side unit in ITS like, for example, an road side ITS station or the like. The method comprises receiving a message from a first communication node in the intelligent transport system in a step S51, deciding, based on location information of the first communication node and location information of at least a second communication node, whether the message is relevant for the at least one second communication node in a step S52, and if it is decided that the message is relevant for the at least one second communication node, determining at least one identifier according to a cellular communication network of the at least one second communication node in a step S53, and causing forwarding the message to the at least one second communication node via the cellular network based on the identifier in a step S54.

According to some example versions of the present invention, the identifier is a cellular identifier identifying a specific cell or area, or the identifier is a subscription or device identifier identifying a specific subscription or device.

Figure 6:
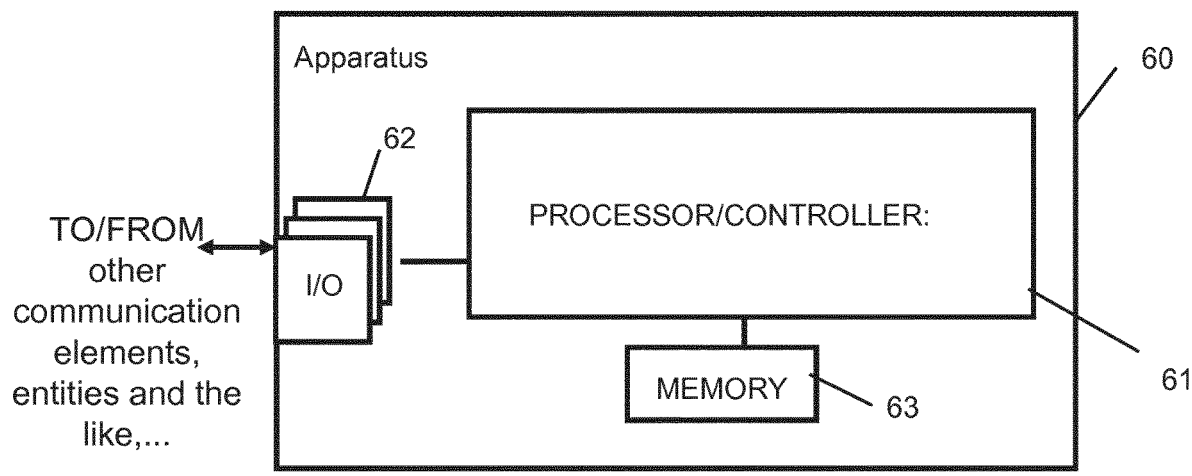
FIG. 6 is a block diagram illustrating an example of an apparatus according to some example versions of the present invention.

FIG. 6 is a block diagram showing an example of an apparatus according to some example versions of the present invention.

In FIG. 6, a block circuit diagram illustrating a configuration of an apparatus 60 is shown, which is configured to implement the above described aspects of the invention. It is to be noted that the apparatus 60 shown in FIG. 6 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 60 may comprise a processing function or processor 61, such as a CPU or the like, which executes instructions given by programs or the like. The processor 61 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 62 denotes transceiver or input/output (I/O) units (interfaces) connected to the processor 61. The I/O units 62 may be used for communicating with one or more other network elements, entities, terminals or the like. The I/O units 62 may be a combined unit comprising communication equipment towards several network elements, or may comprise a distributed structure with a plurality of different interfaces for different network elements. The apparatus 60 further comprises at least one memory 63 usable, for example, for storing data and programs to be executed by the processor 61 and/or as a working storage of the processor 61.

The processor 61 is configured to execute processing related to the above described aspects. In particular, the apparatus 60 may be implemented in or may be part of a network element or communication node of the ITS like, for example, an ITS station or the like, and may be configured to perform a method as described in connection with FIG. 4. Thus, the processor 61 is configured to perform composing a header of a message to be distributed within the intelligent transport system by the communication node, the communication node being capable of communicating at least in accordance with a cellular network, and inserting into the header at least one identifier according to the cellular communication network of the communication node.

According to some example versions of the present invention, the apparatus 60 may be implemented in or may be part of a road side unit in ITS like, for example, an road side ITS station or the like, and may be configured to perform a method as described in connection with FIG. 5. Thus, the processor 61 is configured to perform receiving a message from a first communication node in the intelligent transport system, deciding, based on location information of the first communication node and location information of at least a second communication node, whether the message is relevant for the at least one second communication node, if it is decided that the message is relevant for the at least one second communication node, determining at least one identifier according to a cellular communication network of the at least one second communication node, and causing forwarding the message to the at least one second communication node via the cellular network based on the identifier.

For further details regarding the functions of the apparatus 60, reference is made to the description of the methods according to some example versions of the present invention as described in connection with FIGS. 4 and 5.

Thus, it is noted that the apparatus for use in a network element or communication node of the ITS, and the apparatus for use in a road side unit, generally have the same structural components, wherein these components are configured to execute the respective functions of the network element or communication node of the ITS and the road side unit, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for use by an intelligent transport system (ITS) station, the method comprising:

composing a header of a message to be distributed within an intelligent transport system by the ITS station, the ITS station being capable of communicating at least in accordance with a cellular network;

inserting by the ITS station into the header at least one identifier comprising a cellular identifier identifying a specific cell or area, or a subscription identifier identifying a specific subscription or a device identifier identifying a specific device;

inserting into the header by the ITS station at least an identifier corresponding to a serving cell and an identifier corresponding to a neighbor cell based at least on one or more reports of received power for the serving cell and the neighbor cell., wherein the serving cell is formed by an access point; and distributing by the ITS station the message within the intelligent transport system comprising sending the message to the access point for the cellular network, so that the access point can use the cellular identifier for a message forwarding decision.

2. The method according to claim 1, wherein the header is a geo-networking header or an ITS packet data unit header.

3. The method according to claim 1, wherein the ITS station is configured to insert into the header at least an identifier corresponding to the serving cell and an identifier corresponding to the neighbor cell further based on handover criteria.

4. The method according to claim 1, wherein the one or more reports are from one or more vehicles.

5. The method according to claim 4, wherein each of the one or more vehicles is at a corresponding cell edge and reports its corresponding received power for the serving cell and the neighbor cell.

6. The method according to claim 1, wherein the at least one identifier identifies the specific cell or area.

7. An apparatus for use by an intelligent transport system (ITS) station, the apparatus comprising:
at least one processor; and
at least one memory for storing instructions to be executed by the processor, wherein the at least one memory and the instructions are configured, with the at least one processor, to cause the apparatus at least to perform:

composing a header of a message to be distributed within an intelligent transport system by the ITS station, the ITS station being capable of communicating at least in accordance with a cellular network;

inserting by the ITS station into the header at least one identifier of the communication node, said at least one identifier comprising a cellular identifier identifying a specific cell or area, or a subscription identifier identifying a specific subscription, or device identifier identifying a specific device;

inserting into the header by the ITS station at least an identifier corresponding to a serving cell and an identifier corresponding to a neighbor cell based at least on one or more reports of received power for the serving cell and the neighbor cell, wherein the serving cell is formed by an access point; and distributing by the ITS station the message within the intelligent transport system comprising sending the message to an access point for the cellular network, so that the access point can use the cellular identifier for a message forwarding decision.

8. The apparatus according to claim 7, wherein the header is a geo-networking header or an ITS packet data unit header.

9. The apparatus according to claim 7, wherein the ITS station is configured to insert into the header at least an identifier corresponding to the serving cell and an identifier corresponding to the neighbor cell further based on handover criteria.

10. The apparatus according to claim 7, wherein the one or more reports are from one or more vehicles.

11. The apparatus according to claim 10, wherein each of the one or more vehicles is at a corresponding cell edge and reports its corresponding received power for the serving cell and the neighbor cell.

12. The apparatus according to claim 7, wherein the at least one identifier identifies the specific cell or area.

13. A non-transitory computer-readable medium including a program for a processing device, the program comprising software code portions for performing at least the following, when the program is run on the processing device:

composing by an intelligent transport system (ITS) station a header of a message to be distributed within an intelligent transport system, the ITS station being capable of communicating at least in accordance with a cellular network;

inserting by the ITS station into the header at least one identifier comprising a cellular identifier identifying a specific cell or area, or a subscription identifier identifying a specific subscription, or a device identifier identifying a specific device;

inserting into the header by the ITS station at least an identifier corresponding to a serving cell and an identifier corresponding to a neighbor cell based at least on one or more reports of received power for the serving cell and the neighbor cell, wherein the serving cell is formed by an access point; and distributing by the ITS station the message within the intelligent transport system comprising sending the message to an access point for the cellular network, so that the access point can use the cellular identifier for a message forwarding decision.

14. The computer-readable medium according to claim 13, wherein the header is a geo-networking header or an ITS packet data unit header.

15. The computer-readable medium according to claim 13, wherein the ITS station is configured to insert into the header at least an identifier corresponding to the serving cell and an identifier corresponding to the neighbor cell further based on handover criteria.

16. The computer-readable medium according to claim 13, wherein the one or more reports are from one or more vehicles.

17. The computer-readable medium according to claim 16, wherein each of the one or more vehicles is at a corresponding cell edge and reports its corresponding received power for the serving cell and the neighbor cell.

18. The computer-readable medium according to claim 13, wherein the at least one identifier identifies the specific cell or area.

* * * * *